(12) United States Patent
Schmadl et al.

(10) Patent No.: US 6,425,437 B2
(45) Date of Patent: Jul. 30, 2002

(54) AIR-CONDITIONING SYSTEM FOR A MOTOR VEHICLE

(75) Inventors: Dieter Schmadl, Marbach; Klaus Voigt, Bietigheim-Bissingen; Dietrich Klingler, Heubach; Werner Schwahn, Schwieberdingen, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/817,208

(22) Filed: Mar. 27, 2001

(30) Foreign Application Priority Data

Mar. 30, 2000 (DE) .......................... 100 15 972

(51) Int. Cl.⁷ ................................ B60H 1/32
(52) U.S. Cl. ........................... 165/42; 62/244
(58) Field of Search .................. 62/244; 165/42, 165/43; 237/12.3 A

(56) References Cited

U.S. PATENT DOCUMENTS

| | | | | |
|---|---|---|---|---|
| 5,086,628 A | * | 2/1992 | Hashimoto | 165/42 |
| 5,181,553 A | * | 1/1993 | Doi | 165/42 |
| 5,390,728 A | * | 2/1995 | Ban | 165/42 |
| 5,725,052 A | * | 3/1998 | Kawai et al. | 165/42 |
| 5,775,407 A | * | 7/1998 | Inoue | 165/42 |

FOREIGN PATENT DOCUMENTS

| | | |
|---|---|---|
| DE | 44 33 814 | 3/1996 |
| DE | 196 46 123 | 5/1998 |
| DE | 197 41 862 | 3/1999 |
| DE | 198 35 286 | 2/2000 |
| DE | 197 39 578 | 3/2000 |
| DE | 198 43 322 | 3/2000 |

OTHER PUBLICATIONS

U.S. application No. 09/150,616, filed Sep. 10, 1998, Groemmer et al.

* cited by examiner

*Primary Examiner*—William E. Tapolcai
(74) *Attorney, Agent, or Firm*—Foley & Lardner

(57) ABSTRACT

Disclosed is a motor vehicle air-conditioning system in which individual air-conditioning zones can be air-conditioned independently. The air-conditioning system is divided into four partial regions by partitions. In order to provide as small a construction space as possible as well as simple regulation, the coolant stream through the heater (22) is regulatable, in order to bring the entire heater (22) to a specific temperature. Thus, air flowing through the heater (22) can be controlled to a maximum temperature dependent on the temperature of the heater (22), corresponding to the (warmest) air temperature desired in one of the interior zones (HL, VL, VR, HR). In the other region(s) (B1, B2, B3, B4) of the air-conditioning system (10), the temperature of the air to be introduced into the other interior zone(s) (HL, VL, VR, HR) can be lowered by means of cold air guided via a bypass (32R, 62R).

8 Claims, 2 Drawing Sheets

AIR-CONDITIONING SYSTEM FOR A MOTOR VEHICLE

FIELD OF THE INVENTION

The present invention relates to an air-conditioning system for a motor vehicle, by means of which individual air-conditioning zones of the vehicle interior can be supplied with separately temperature-controllable air. The present invention also relates to a method for controlling the temperature of a vehicle interior by means of this air conditioning system.

BACKGROUND OF THE INVENTION

DE 197 39 578 A1 (corresponding to U.S. patent application Ser. No. 09/150,616, filed Sep. 10, 1998) discloses an air-conditioning system regulated on the air side. In this system, the space downstream of the heater, in which cold air guided past the heater can be mixed with warm air, is subdivided into four air mixing spaces located next to one another and separated by partitions. The partitions extend below the heater and likewise subdivide the cold-air bypass into four part ducts. By means of warm-air flaps arranged directly downstream of the heater and cold-air flaps for selectively closing the cold-air bypasses, an individual temperature can be set in each mixing space. This is accomplished irrespective of the temperatures in the other mixing spaces, by means of cold air being mixed with the warm air according to the desired ratio. During this so-called air-side temperature regulation, the hot engine coolant constantly flows through the heater. The individually temperature-controlled air of the individual air mixing spaces can be fed via air ducts to the corresponding air-conditioning zones of the vehicle.

The general problem of present day air-conditioning systems with their components, in particular the air valves or flaps, is basically that the construction space available for the air-conditioning system is very limited, and these systems therefore have to be constructed in an increasingly more compact form. Particularly those air-conditioning systems that are suitable for differently controlling the temperature of various air-conditioning zones, such as the system known from DE 197 39 578 A1, tend to require a larger construction space because of their larger number of structural parts. Furthermore, the regulation of the large number of flaps for setting the temperature in the four individual air mixing spaces, for the four interior zones, is highly complicated.

SUMMARY OF THE INVENTION

It is therefore one object of the present invention to provide an improved heating or air-conditioning system, by means of which individually temperature-controllable air can be provided for the different air-conditioning zones of the vehicle, which requires as small a construction space as possible and which allows simple regulation.

A further object of the invention is to provide an improved method for controlling the temperature of various interior zones of the motor vehicle.

In accomplishing these objects, there has been provided according to one aspect of the present invention a heating or air-conditioning system comprising: an evaporator for providing cold air; a heater located downstream of the evaporator for generating warm air heated by coolant from the motor vehicle engine, this heater having at least one partition dividing the air-conditioning system downstream of the evaporator into at least two regions arranged next to one another; a cold-air bypass duct guided past the heater in each of the regions; a regulator system for regulating the temperature of the coolant in the heater for bringing the entire heater to a predetermined temperature, whereby air flowing through the heater is controlled to a maximum temperature that is dependent on the temperature of the heater and that corresponds to an air temperature desired in a first interior zone of the vehicle; and an air control element in at least one of the bypass ducts for selectively bypassing cold air in at least one of the regions to lower the temperature of the air that is to be introduced into a second interior zone of the vehicle.

In accordance with another aspect of the present invention, there has been provided a method for independently controlling the temperature of a plurality of zones in a vehicle interior, by means of an air-conditioning system that includes a heater for exchanging heat with coolant from a vehicle engine, comprising: regulating the coolant throughflow through the heater to produce air exiting the heater at a first temperature corresponding to the highest temperature required in a first zone in the vehicle; supplying air at the first temperature to the first zone of the vehicle; and regulating the temperature of air provided to at least a second zone in the vehicle to a second temperature lower than the first temperature, by lowering the temperature of air exiting the heater at the first temperature by selectively admixing cooler air therewith.

Further objects, features and advantages of the present invention will become apparent from the detailed description of preferred embodiments of the invention that follows, when considered together with the accompanying figures of drawing.

BRIEF DESCRIPTION OF THE DRAWINGS

The invention is explained in detail below by means of an exemplary embodiment, with reference to the drawings in which.

DETAILED DESCRIPTION OF THE PREFERRED EMBODIMENTS

Figure 1:
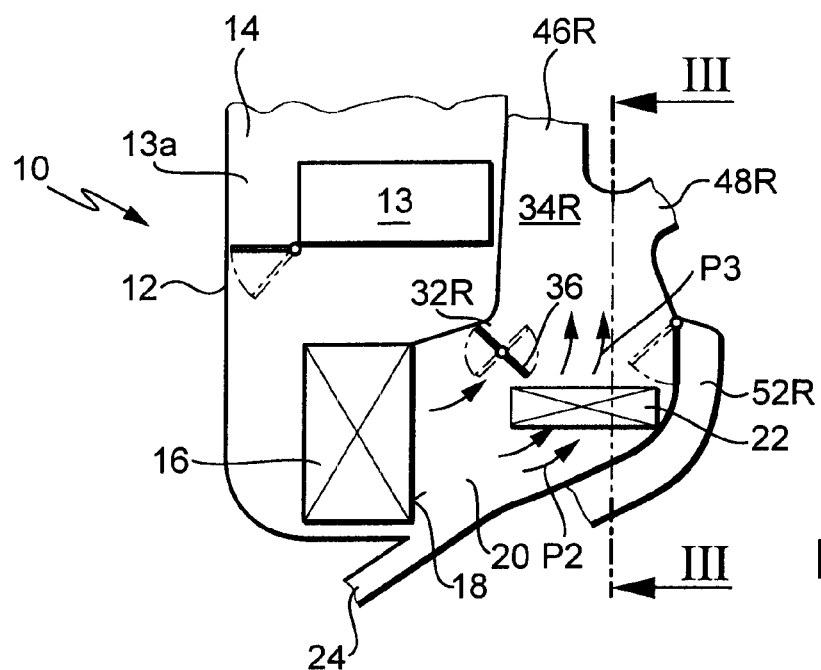
FIG. 1 shows a vertical cross section through a diagrammatically illustrated air-conditioning system according to the invention along a line I—I in FIG. 3, in the region of the path for air intended to be fed to a front region of the vehicle interior.

According to the invention, the coolant stream through the heater is capable of being regulated, in order to bring the entire heater to a specific temperature, so that the air flowing through the heater can be controlled to a maximum temperature dependent on the temperature of the heater. This maximum temperature corresponds to the air temperature that is desired in one of the interior zones. The temperature of the air in the other regions, which are assigned to the other interior zones, can be lowered by means of cold air conducted via the bypass. The air-conditioning system according to the invention thus operates both on the water-side regulating principle and on the air-side regulating principle. In this case, the air temperature of the air conducted into the interior zone that is to acquire the highest temperature is regulated on the water side. That is to say, the coolant throughflow through the heater is set correspondingly in order to reach this maximum temperature. In the region of the air-conditioning system that is assigned to this interior zone, the cold-air bypass is closed. The interior zone, in which the highest temperature is desired, may be, for example, the driver's zone, the front-seat passenger's zone or the left back or right back. In the remaining zones, either this maximum temperature is likewise demanded, or a lower temperature might be desired, which can then be set on the air side. This is done by conducting cold air via the bypass, which can be admixed with the warm air having the maximum temperature. Since each region is assigned a separate cold-air bypass duct, differently temperature-controlled air can be fed to each of to the remaining interior zones.

The advantage of an air-conditioning system of this type is that the outlay in regulating terms is reduced and air-side temperature regulation for the zones in which a lower temperature than the maximum temperature is demanded takes place very quickly. Thus, the air-conditioning system has a high response rate, that is to say, reacts very quickly to a desired temperature change requirement. A further advantage is that, overall, the temperature level is lower due to the water-side regulation of the maximum temperature, and this means, overall, an energy saving. Fine tuning can be carried out considerably more simply with the air-conditioning system according to the invention. This is also attributable, inter alia, to the fact that, overall, the temperature differences within the air-conditioning system between, for example, the coolant, the heater and the air to be temperature-controlled are lower than in an air-conditioning system regulated on the air side. A heat exchanger of a known type can be used in a cost-effective way as the heater.

Preferably, three partitions are provided for the formation of, altogether, four regions arranged next to one another. In this way, the air-conditioning system has an elongate design transversely to the direction of travel of the vehicle, and the heating body has its greatest extent transversely to the direction of travel. This configuration also has the advantage that the air-conditioning system can be arranged in the instrument panel and does not extend downwardly, for example, in the region of the center console. In this area, space is thereby reserved for additional devices, such as a navigation instrument, radio, etc.

In a preferred embodiment of the invention, additional second cold air bypasses may be provided in individual regions, so that cold air can be fed via these additional bypasses to individual air outlet orifices in a center plane of the motor vehicle. This may be desired, for example, in the front region, in which temperature stratification, that is to say, a temperature difference between the foot space region and the head region, is often desired. Preferably, the heater is arranged so as to lie flat, in particular approximately horizontally, in the installed position, so that the cold air can be guided past the heater in a simple way.

At the same time, it is particularly advantageous if, in the regions that are assigned to the zones in the interior front region, the air flows upwardly through the heater from the bottom and, in the regions that are assigned to the zones in the interior back region, the air flows through the heater downwardly from the top. The air distribution spaces and air ducts, which are connected to one another and guide the air to the assigned zones, can then be arranged in a space-saving way. For example, the ducts for the front region are led away in an upward direction, and the ducts for the back region can be led away in a downward direction and can be guided over the vehicle floor into the back region. For reasons of construction space, it is likewise advantageous if the outer regions of the header/air conditioner are assigned to the back space and the inner regions to the front space.

Turning now to the drawings, a heating or air-conditioning system 10 according to the invention has a housing 12 for guiding air to be temperature-controlled. Recirculated air and/or fresh air is fed, for cooling, to an evaporator 16 via a blower, not illustrated, and a filter 13 arranged in an air feed duct 14 or a filter bypass 13a. The air cooled in the evaporator 16 emerges from the evaporator 16 on its air outlet side 18 and enters a cold-air region 20 that extends downstream of the evaporator 16 over the entire height of said evaporator.

A heater 22 is arranged, preferably lying flat (horizontal), downstream of the evaporator 16 on the airstream side. The heater 22 is designed as a heat exchanger, through which a coolant for a drive assembly (engine) of the motor vehicle is capable of flowing, and optionally has, in addition, electrical heating elements, as is known, for example, from DE 44 33 814 A1, the disclosure of which is hereby incorporated by reference.

Provided at the lower end of the cold-air region 20 is a water outflow 24, through which water condensed in the evaporator and discharged from the air outlet side 18 can drain.

The air-conditioning system 10 according to the invention is suitable for the air-conditioning of, for example, four different zones in the vehicle interior. The four zones are, as a rule, for example, in a sedan, the driver's region, designated by VL (front left), the front seat passenger's region, designated by VR (front right), the left rear region, designated by HL (rear left) and the right rear region, designated by HR (rear right).

So that the temperature of the air of the individual zones can be controlled independently from one another, the air-conditioning system is subdivided downstream of the cold-air region 20, by three partitions 26, 28, 30, into four regions B1, B2, B3, B4 (FIG. 3) located next to one another and assigned to the zones HL, VL, VR and HR. The partitions extend, both in front of and behind the heater 22 on the airstream side, from the cold air region 20 and extending as far as outlet orifices to which air ducts going to the vehicle interior are connected. The regions B1, B2, B3, B4, which are arranged next to one another and in which a partial airstream is guided in each case for supplying the respective zones HL, VL, VR and HR, are therefore separated on the air side.

Figure 4:
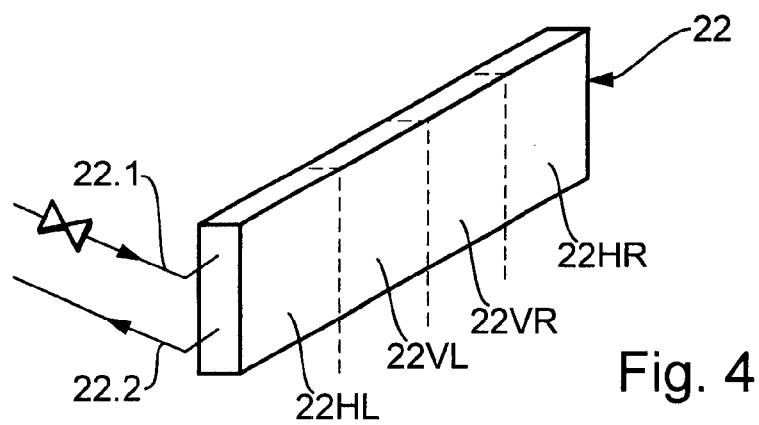
FIG. 4 shows a diagrammatic perspective illustration of a heater.

The heater 22, which is illustrated diagrammatically in FIG. 4, is designed in a known way as a heat exchanger and has a coolant inflow 22.1 and a coolant outflow 22.2. The coolant stream through the entire heater 22 can be regulated by means of a valve, illustrated schematically, so that the temperature of the heater 22 can be regulated. Each sub-region 22HL, 22VL, 22VR and 22HR of the heater body, located in the respective region B1, B2, B3, B4, therefore has the same temperature.

The air-conditioning system, with its evaporator 16 and heater 22, is designed to be elongate in its transverse direction, that is to say in the direction of the double arrow 31, so that the sub-regions 22HL, 22VL, 22VR and 22HR of the heater 22 that are located in the individual regions B1, B2, B3, B4 are large enough to be capable of heating the respective partial airstream sufficiently, whereas at one and the same time, the air conditioning system is kept as small as possible in the direction H of its height and the direction T of its depth.

Figure 2:
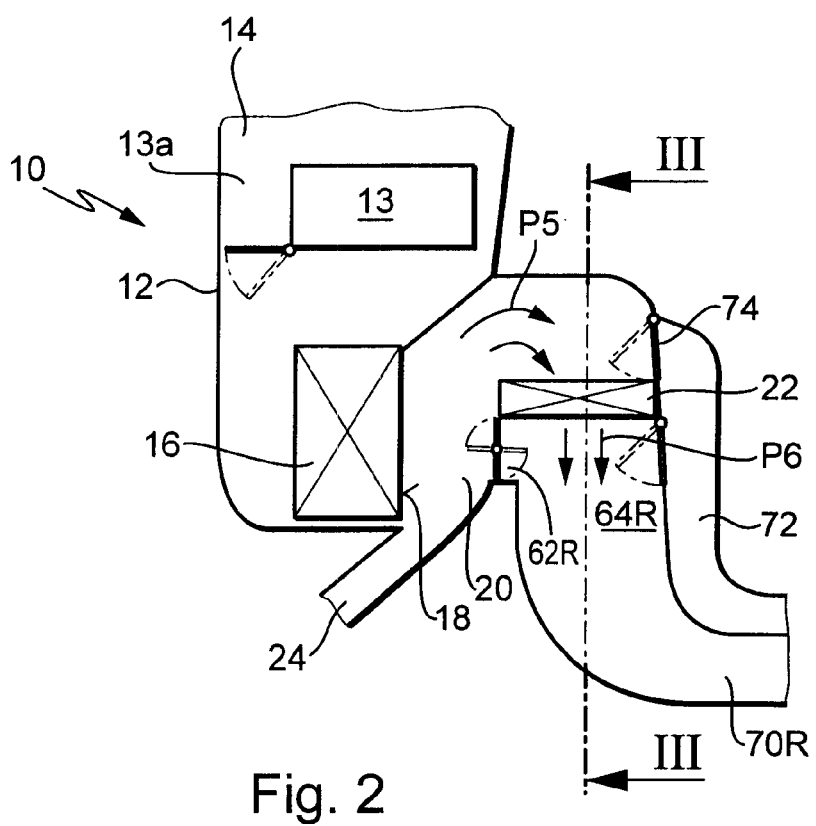
FIG. 2 shows a vertical cross section through the diagrammatically illustrated air-conditioning system according to the invention, which runs parallel to the cross section of FIG. 1 along a line II—II in FIG. 3, in the region of the path for air intended to be fed to a rear region of the vehicle interior.
Figure 3:
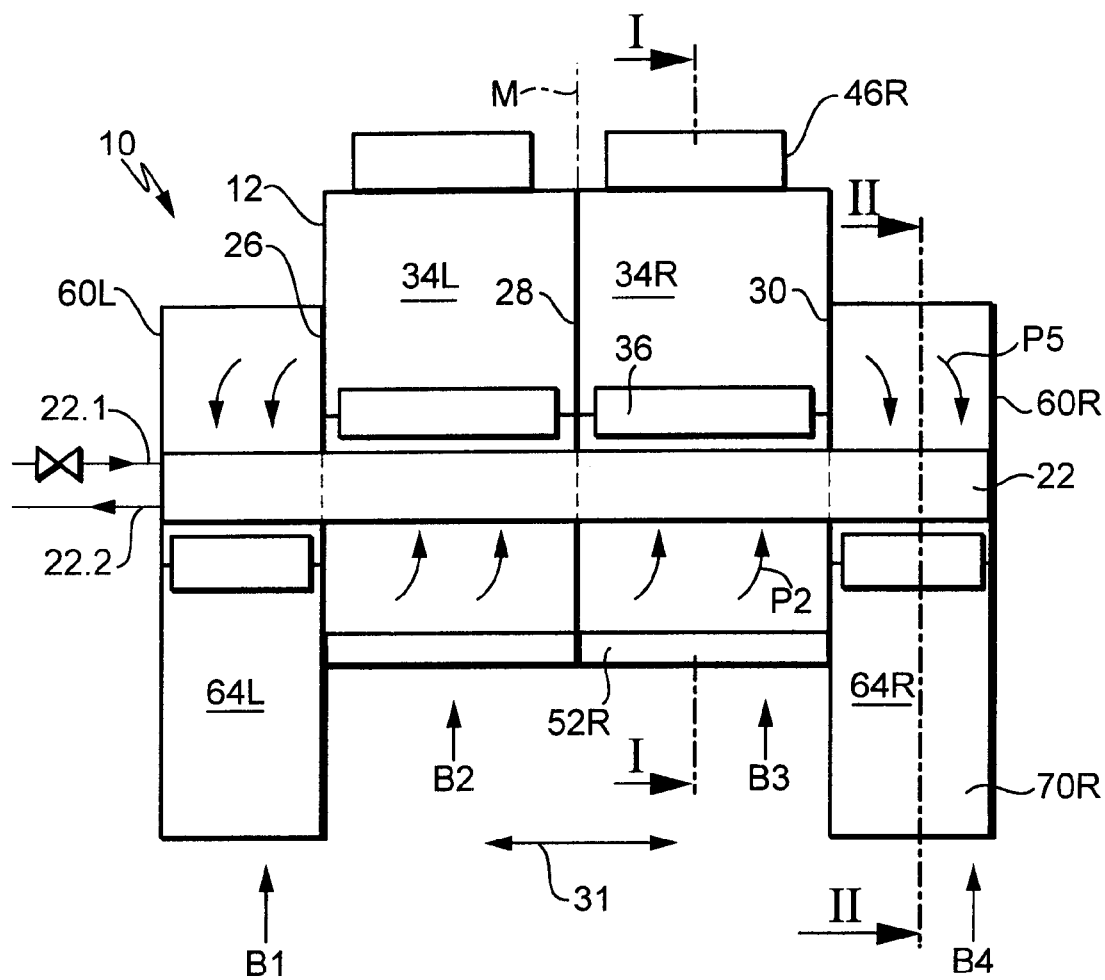
FIG. 3 shows a transverse vertical cross section through the air-conditioning system according to the invention along the line III—III in FIGS. 1 and 2.

To understand the makeup of the air-conditioning system according to the invention, it is sufficient to look at the cross sections from FIGS. 1 and 2 along the lines I—I and II—II in FIG. 3, together with the illustration from FIG. 3. The regions B1 and B2 are mirror images of the two illustrated regions B3 and B4.

The regions and elements of the air-conditioning system that are relevant to the air-conditioning of the front region VR are described first with reference to FIGS. 1 and 3.

Cold air can flow from the cold air region 20, via a cold air duct 32R arranged above the heater 22, into a mixing space 34R. The cold air duct 32R can be closed via a cold-air bypass flap 36.

Cold air can flow (arrows P2) out of the cold air region 20 from below into the sub-region 22VR of the heater 22, flow through this sub-region and at the same time be warmed. The warm air (arrows P3) thus formed can enter a mixing space 34R and be mixed with the cold air there.

The air mixing space 34R is followed by a defrosting air duct 46R, an air duct 48R to ventilation nozzles (personal blowers) arranged in the instrument panel and a foot space air duct 52R. The air ducts can in each case be closed via flaps which in some cases are not illustrated.

The air ducts 46R, 48R and 52R lead in each case only into the right half of the vehicle, so that the partial region between the partitions 28 and 30 serves for controlling the temperature of the air for the zone VR.

Since the air-conditioning system is in this region designed mirror-symmetrically to the center plane M, the air for the zone VL is temperature controlled in a similar way in the partial region between the partitions 26 and 28 and is guided from the corresponding air mixing space 34L into corresponding air ducts.

The two inner partial regions B2 and B3, between the partitions 26 and 30, thus serve for controlling the temperature of the air for the front space, with the air flowing upwardly through the sub-regions 22VL and 22VR of the heater from the bottom.

Further partial regions B1 and B4 are arranged next to the two inner partial regions B2 and B3, in each case toward the outside of the air-conditioning system (FIG. 3). The partial region B4 between the partition 30 and a side wall 60R of the housing 12 is assigned to the right back space (HR), and, correspondingly, the partial region B1 between the left partition 26 and left side wall 60L is assigned to the left back space (HL).

FIG. 2 shows a cross section along the line II—II in FIG. 3, i.e., through the partial region in which the temperature of the air for the zone HR is controlled. Here, a cold-air bypass flap 62R is arranged below the heater 22, so that cold air can flow from the cold air region 20 into an air mixing space 64R arranged below the heater 22R. Furthermore, cold air can flow (arrows P5) from above into the sub-region 22HR of the heater 22 and be warmed there. The warm air emerging from the sub-region 22HR flows directly into the air mixing space 64R (arrows P6). The air, which has a specific temperature, can be fed from the air mixing space 64R, via a rear air duct 70R, to the corresponding rear zone HR.

The temperature of the air for the rear zone HL can be controlled in a similar way, and will not be described in detail for that reason.

As can be understood, in particular, from FIG. 3, the air mixing spaces 34R and 34L, out of which the air is guided to the front space, are arranged above the heater 22, and the air mixing spaces 64R and 64L are arranged below the heater 22. In this way, the air ducts connected to the air mixing spaces can be arranged one above the other advantageously, and this construction saves space.

To control the temperature of the vehicle interior, the heater 22 is set at a temperature that is sufficient to warm the partial airstream for the zone for which the highest temperature has been requested, preferably without cold air having to be admixed via the corresponding cold air bypass. If the same temperature has been requested for another zone, the airstream could also be obtained for this zone, without cold air being admixed. In the other zone or other zones in which the highest temperature is desired, the air temperature is therefore set solely by water-side regulation.

If a lower temperature has been requested for the remaining zones, this is achieved by an appropriately dimensioned cold-air stream being admixed with the warm air via the cold-air bypass. The temperature is therefore set on the air side here, and the temperature of the warm air corresponds only to the highest temperature set on the water side.

The cold-air bypass flaps are therefore preferably set in such a way that the bypass flap in the region that corresponds to the zone with the highest temperature remains closed, and the temperature there is regulated on the water side, that is to say, via the coolant throughflow through the heater. The air temperature for one or more of the other zones is then lowered on the air side, starting from the temperature level of the heater, which has been predetermined by the air temperature demanded for the warmest zone.

In a preferred embodiment of the invention, as shown by way of example in FIG. 2 for rear ventilation, individual regions may be provided with an additional cold-air bypass 72, through which cold air of regulatable quantity can be fed via a bypass flap 74 through air outlet orifices in a center plane of the motor vehicle. This is desired in vehicles equipped to a higher standard, in order to obtain, within a particular zone, temperature stratification, that is to say, for example, a physiologically agreeable temperature difference between the foot space and the upper body region.

The disclosure of German Patent Application No. 100 15 972.9, filed Mar. 30, 2000, is hereby incorporated by reference in its entirety.

Additional advantages and modifications of any of the above-described embodiments will readily occur to those skilled in the art. Therefore, the invention in its broader aspects is not limited to the specific details, and representative devices, shown and described herein. Accordingly, various modifications may be made without departing from the spirit or scope of the invention as defined by the appended claims.

What is claimed is:

1. An air-conditioning system for an engine-driven motor vehicle comprising:

an evaporator for providing cold air;

a heater located downstream of the evaporator for generating warm air heated by coolant from the motor vehicle engine, said heater having at least one partition dividing the air-conditioning system downstream of the evaporator into at least two regions arranged next to one another;

a cold-air bypass duct guided past the heater in each of said regions;

a regulator system for regulating the temperature of the coolant in the heater for bringing the entire heater to a predetermined temperature, whereby air flowing through the heater is controlled to a maximum temperature that is dependent on the temperature of the heater and that corresponds to an air temperature desired in a first interior zone of the vehicle; and an air control element in at least one of said bypass ducts for selectively bypassing cold air in at least one of said regions to lower the temperature of the air that is to be introduced into a second interior zone of the vehicle.

2. An air-conditioning system as claimed in claim 1, comprising three of said partitions for forming four regions arranged next to one another.

3. An air-conditioning system as claimed in claim 2, further comprising cold-air bypasses provided in each of said individual regions, and wherein said cold-air bypasses are oriented so that cold air can be fed to air outlet orifices in a horizontal center plane of the motor vehicle.

4. An air-conditioning system as claimed in claim 2, wherein the heater is arranged so as to lie essentially flat.

5. An air-conditioning system as claimed in claim 4, wherein the heater lies approximately horizontally.

6. An air-conditioning system as claimed in claim 4, wherein, the two central regions are assigned to two zones in the interior front region of the vehicle, and in these regions, the air flows through the heater from bottom to top, and the two outer regions are assigned to two zones in the interior rear of the vehicle, and in the outer regions air flows through the heater from top to bottom.

7. An air-conditioning system as claimed in claim 2, wherein the two outer regions are assigned to the left and right rear space in the vehicle and the two inner regions are assigned to the left and right front space of the vehicle.

8. A method for independently controlling the temperature of a plurality of zones in a vehicle interior, by means of an air-conditioning system that includes a heater for exchanging heat with coolant from a vehicle engine, comprising:

regulating the coolant throughflow through the heater to produce air exiting the heater at a first temperature corresponding to the highest temperature required in a first zone in the vehicle;

supplying air at said first temperature to said first zone of the vehicle; and regulating the temperature of air provided to at least a second zone in the vehicle to a second temperature lower than said first temperature, by lowering the temperature of air exiting the heater at said first temperature by selectively admixing cooler air therewith.

* * * * *